Sept. 11, 1951 W. R. HARRISON ET AL 2,567,334
METAL SPINNING APPARATUS
Filed June 21, 1946 7 Sheets-Sheet 2

INVENTORS
WILLIAM R. HARRISON
WILFORD G. KILPATRICK
HANS J. ZIMMERMANN
NOLTE V. SPROUL AND
LOUIS C. GALLEHER
BY
ATTORNEYS

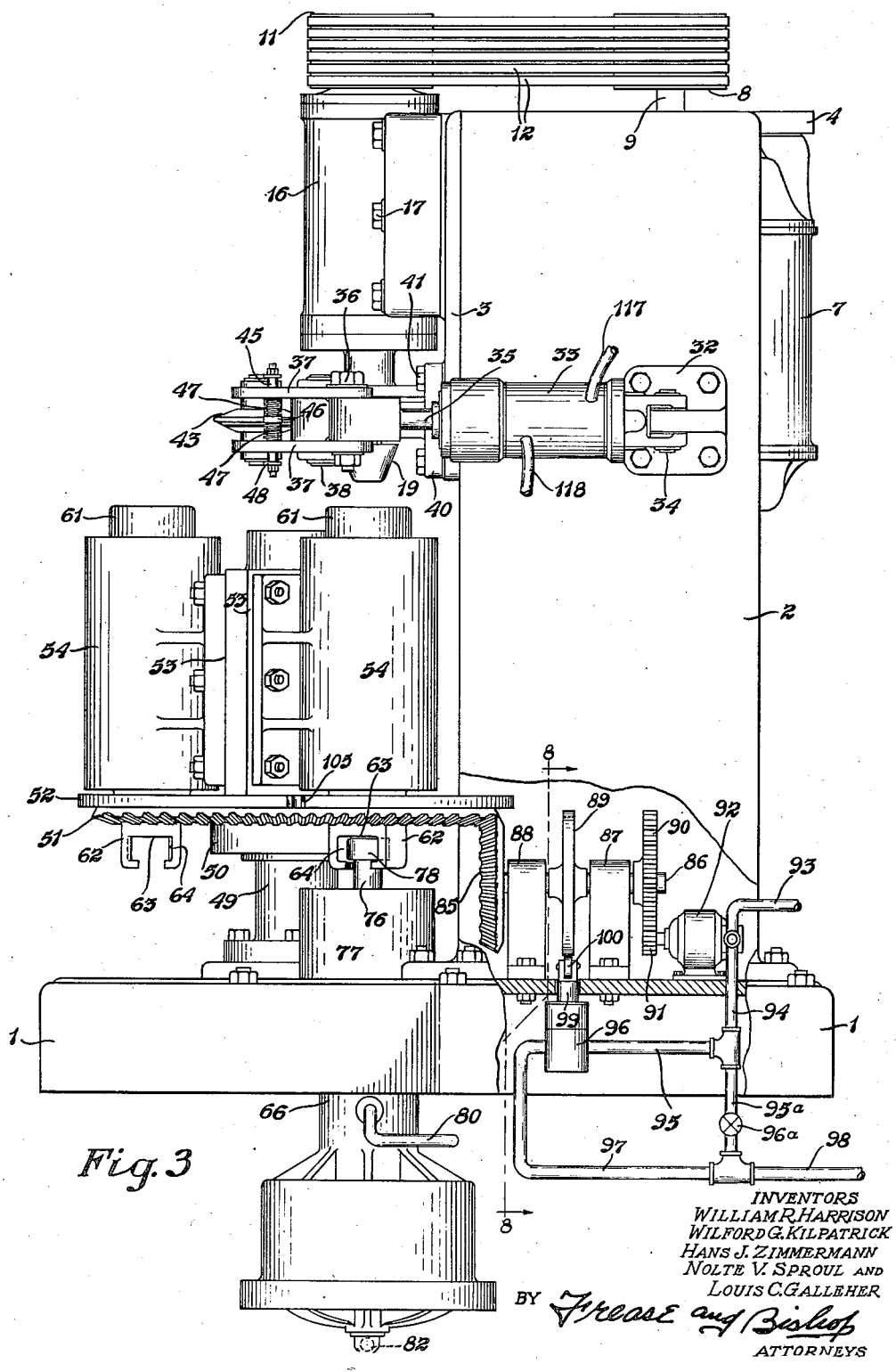

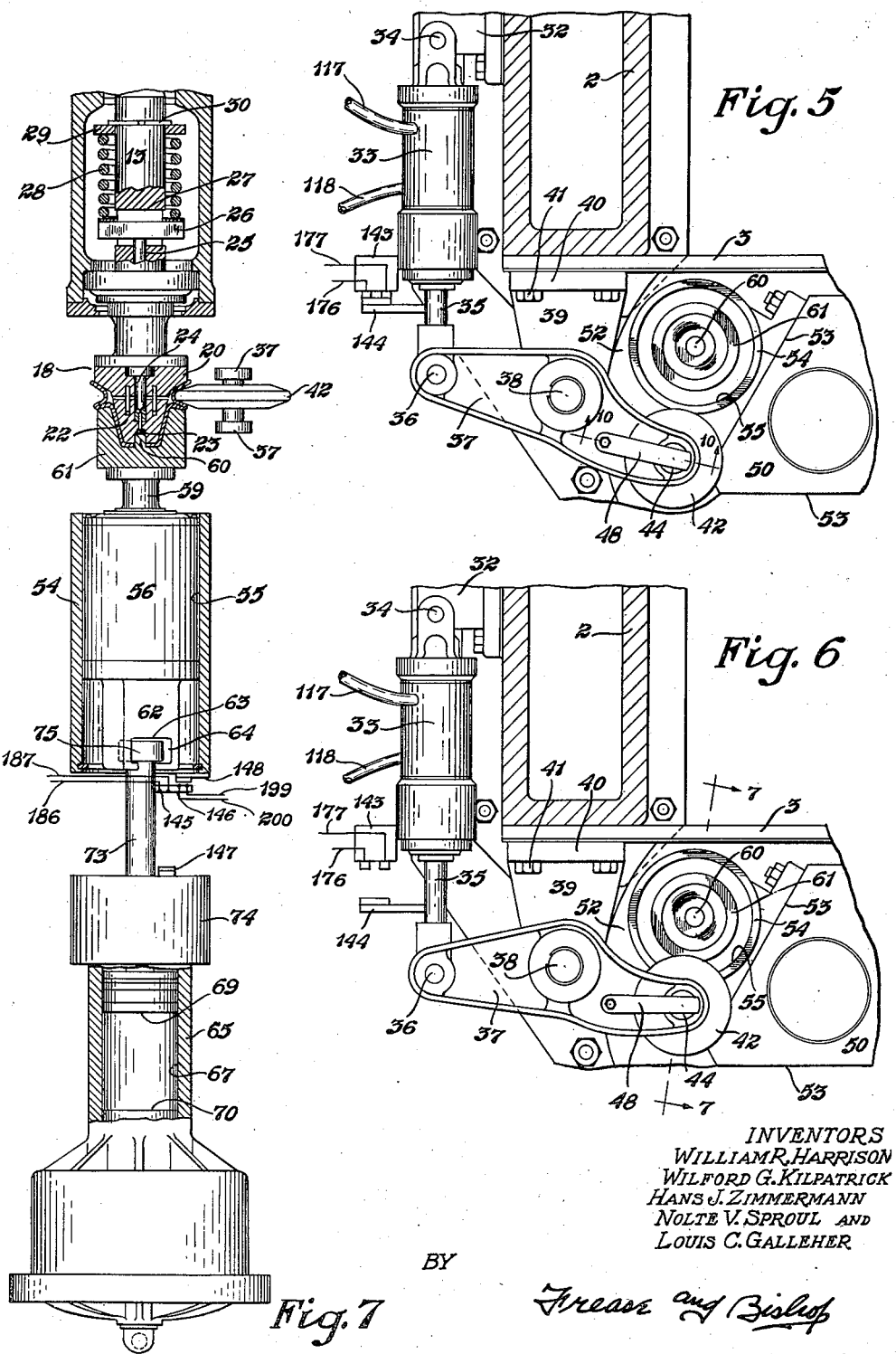

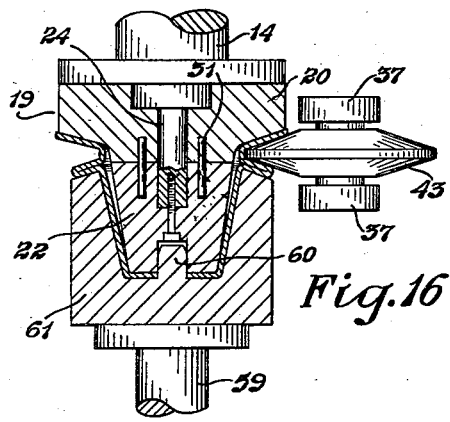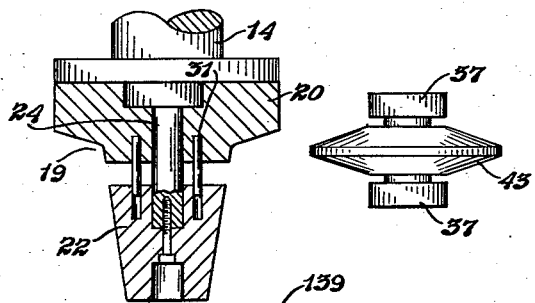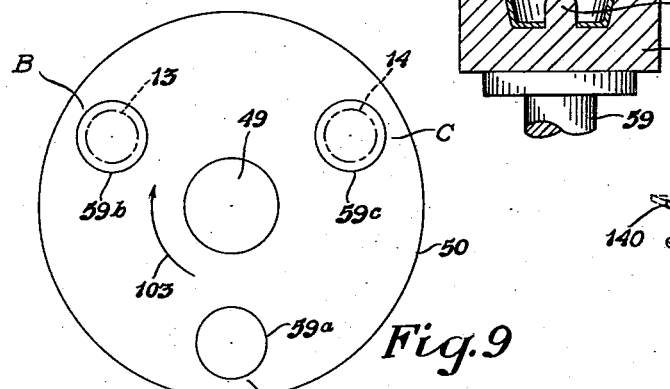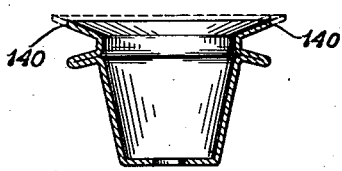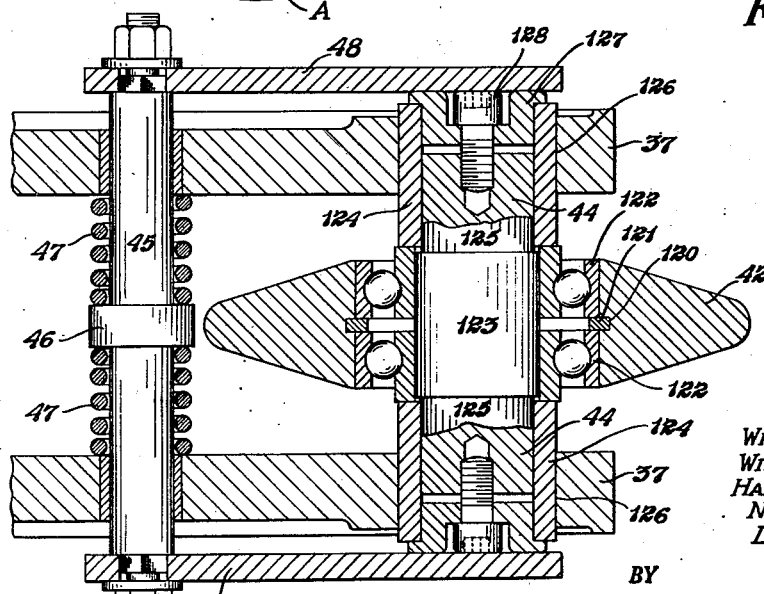

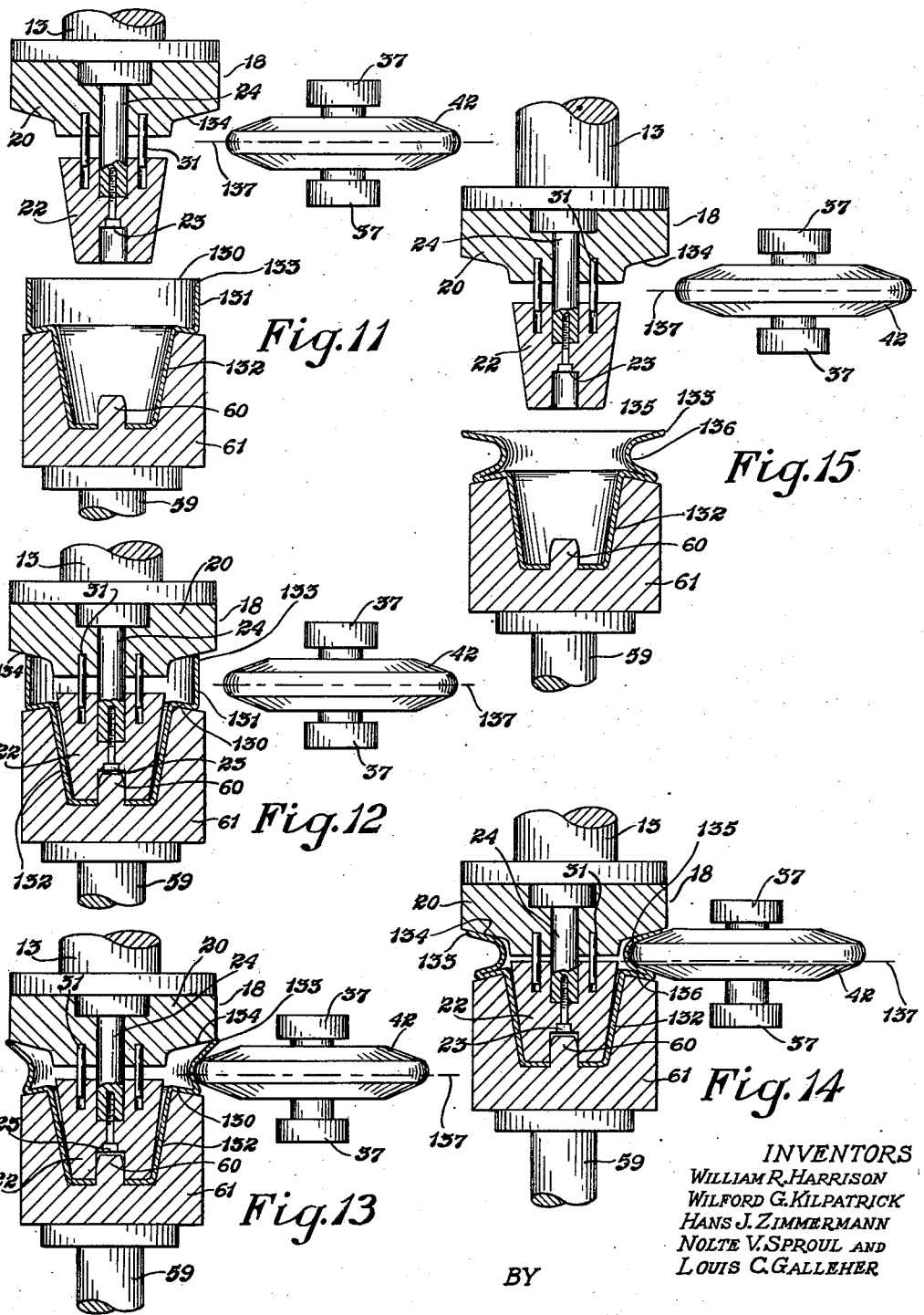

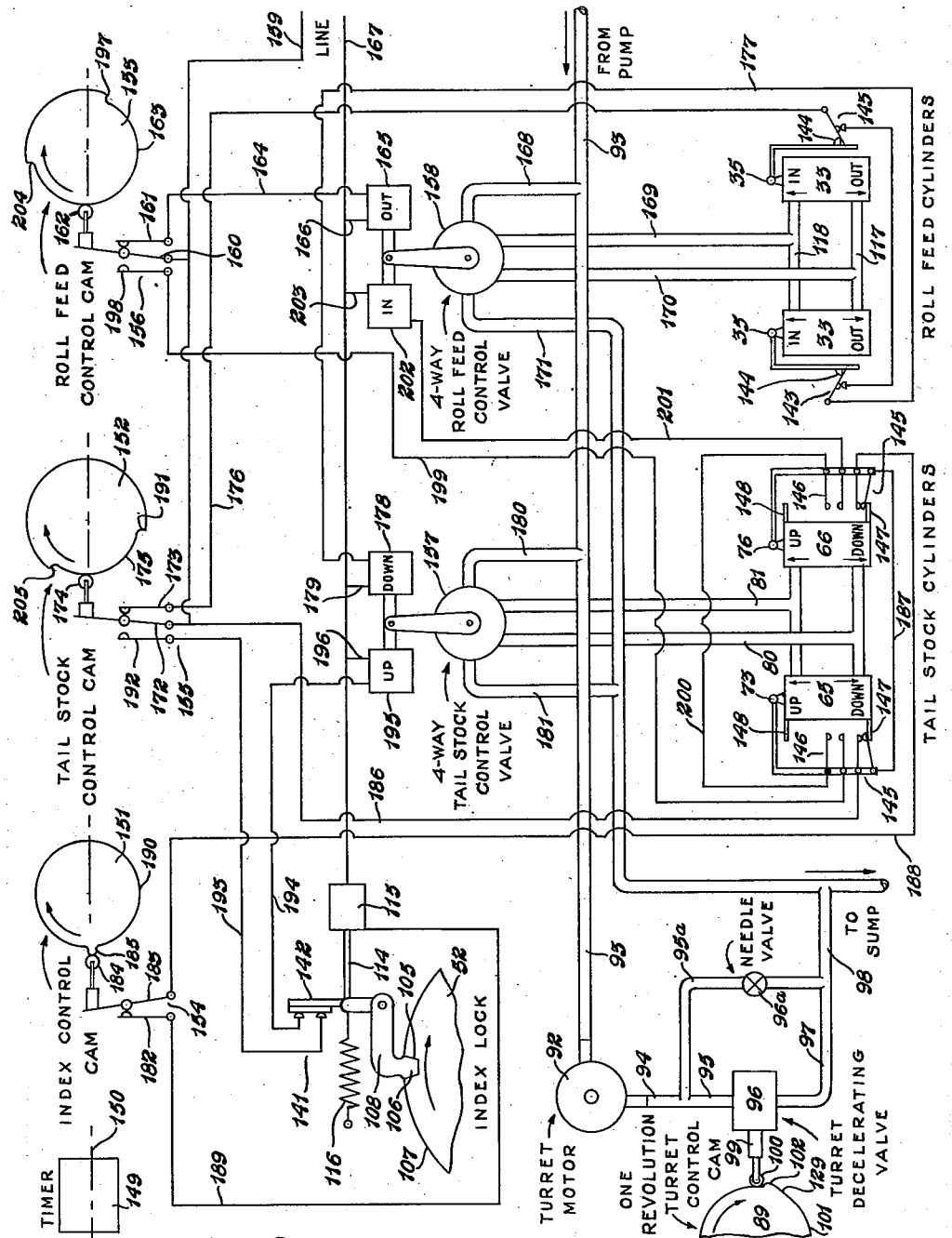

Patented Sept. 11, 1951

2,567,334

UNITED STATES PATENT OFFICE 2,567,334

METAL SPINNING APPARATUS

William R. Harrison, Hartville, and Wilford G. Kilpatrick, Hans J. Zimmermann, Nolte V. Sproul, and Louis C. Galleher, Canton, Ohio, assignors, by mesne assignments, to Automatic Steel Products, Inc., Wilmington, Del., a corporation of Delaware Application June 21, 1946, Serial No. 678,296

9 Claims. (Cl. 113—52)

The invention relates to methods and apparatus for precision roller spinning articles such as V-grooved pulleys of ductile material, such as metal, and preferably rolled steel sheets or strips, and relates more particularly to methods and apparatus for the automatic spinning of a plurality of articles at one time.

More particularly, the present improvements are adapted for the manufacture of the V-groove pulleys set forth in the U. S. Nelson Patent No. 1,680,061, and constitute improvements upon the methods and apparatus set forth in said Nelson Patent No. 1,680,061 and in the U. S. Harrison Patents Nos. 1,828,464 and 2,062,415.

The method of roller spinning set forth in each of said prior patents generally includes rotating material to be spun, applying radial pressure to the rotating material, and applying an axially directed thrust to the rotating material during the application of the radial pressure.

In said prior patents, the radial pressure is applied either by manually actuated non-yielding mechanical means or by automatically actuated non-yielding mechanical means or by manually actuated yielding pressure means; and the axially directed thrust is applied by manually or automatically controlled piston means actuated by the expansion of a compressible medium such as compressed air.

However, certain difficulties have been encountered in using the methods and apparatus of said prior patents as follows:

First, only one pulley may be spun at one time on any one machine.

Second, one operator is required for each such machine.

Third, the receiving die for the article being spun is mounted for rotation on a horizontal axis which causes more difficulty and fatigue to the operator in loading and unloading than if the article were dropped into or removed from a receiving die mounted for rotation on a vertical axis.

Fourth, in loading and unloading the operator must place the article upon or strip it from a rotating die, or in the alternative the rotating die must be stopped for loading and unloading. The former operation involves danger, hazard and possible injury to the operator while the latter operation, although avoiding the dangers of the former, involves loss of machine time while the machine is stopped for unloading and loading. Moreover, the operator's hands are subject to possible injury because in loading, a second die approaches the die on which the blank is loaded and the operator only has a short time interval within which to load and remove his hands to a place of safety.

Fifth, it is frequently difficult for certain sizes of pulleys or metal gauges to obtain the proper balance and magnitude of pressures required for the radially and axially applied or directed pressures or thrusts, whether or not these pressures or thrusts are applied manually or automatically, or are applied yieldingly or non-yieldingly, or are coordinated manually or automatically or mechanically.

Sixth, rotation of the article being spun depends upon frictional engagement of the article with a rotating spinning die by the axial thrust applied during the application of radial pressure; and since the axial thrust varies during the application of radial pressure, slippage may occur which may damage the article being spun or cause excessive wear upon the spinning dies.

Seventh, the travel of the spinning roll inward of the V-groove in forming a V-groove in a cylindrical wall of a work-piece is always in a single plane normal to the axis upon which the work-piece is rotated, and the spinning roll therefore cannot accommodate itself to the metal flow in the work-piece so as to provide equalized pressure upon each of the V-surfaces of the groove as the V-groove is being formed.

Eighth, absolute precision manufacture or uniformity of product is not always obtained even though variations may be very slight.

Ninth, no means are provided for protecting the operator or machine from injury or damage in the event that the operator accidentally omits or does not perform an operational step or that the machine fails to function properly.

Accordingly, it is an object of the present invention generally to improve the art of making roller spun V-groove pulleys.

Also, it is an object of the present invention generally to improve the methods and apparatus of the enumerated prior art patents so as to eliminate the difficulties and disadvantages encountered in their use, as above set forth.

More particularly, the objects of the present invention include the provision of the improved apparatus in the form of an automatic turret type spinning apparatus in which there are provided means constituting a loading and unloading station, and one or more spinning stations, preferably including a rough spinning station and a finishing spinning station, the operation of the apparatus being entirely automatic, excepting for manual loading and unloading of the blanks and finished spun articles at the loading station, and in which the automatic operation of the apparatus is effected by electrical and fluid actuated devices arranged and interlocked with each other so as to substantially eliminate the possibility of injury to the operator and prevent improper action of the component parts of the apparatus which might otherwise result in damage to the apparatus.

These and other objects and advantages apparent to those skilled in the art from the following description and claims may be obtained, the stated results achieved, and the described difficulties overcome, by the methods, steps, procedures, operations, devices, constructions, arrangements, combinations, sub-combinations, parts and elements which comprise the present invention, the nature of which are set forth in the following general statements, a preferred embodiment of which—illustrative of the best mode in which applicants have contemplated applying the principle—is set forth in the following description and shown in the drawings, and which are particularly and distinctly pointed out and set forth in the appended claims forming part hereof.

The nature of the improved method of the present invention may be stated in general terms as including roller spinning an article of ductile material by rotating the article about an axis, which may be termed the spinning axis, applying upon the rotating article a moving axial thrust or compressive force in the direction of the spinning axis and opposed by a thrust or compressive force, applying a moving roller spinning pressure upon portions of the article between the compressive forces, the directions of motion of the moving compressive force and of the moving roller spinning pressure being angular to each other, the moving roller spinning pressure being preferably radial with respect to the spinning axis, maintaining a minimum axial thrust or pressure at the beginning of the application of the radial roller spinning pressure, increasing the axial thrust or pressure to a maximum at the completion of the moving roller spinning pressure, and equalizing the application of the radial roller spinning pressure between the opposing axial thrusts or compressive forces.

The nature of the improved apparatus of the present invention may be stated in general terms as including in a spinning apparatus a plurality of headstocks, means for rotating said headstocks, a multiple position rotary indexing turret, means for rotating said turret, a plurality of rotatable and axially movable tailstocks mounted on the turret, means for axially moving said tailstocks, spinning die form members mounted on the headstocks and tailstocks, self-equalizing roughing spinning roll means mounted for movement to and away from certain of said headstock die form members, self-equalizing finishing spinning roll means mounted for movement to and away from other of said headstock die form members, means for moving said spinning roll means to and away from said die form members; and safety, sequence, timing and control mechanism for the spinning apparatus including electric control and operating circuits, hydraulic control and operating valves and systems, and interacting means coordinating the operation of the hydraulic systems and electric circuits; whereby metal blanks may be loaded on the spinning apparatus and advanced therethrough in a continuous cycle to a rough spinning station, then to a finishing spinning station, and then to an unloading and loading station.

By way of example, a preferred embodiment of the improved spinning apparatus is illustrated in the accompanying drawings forming part hereof, wherein:

Fig. 3 is a side elevation of the improved spinning apparatus with certain parts broken away;

Fig. 5 is a fragmentary view looking in the direction of the arrows 5—5, Fig. 1, with the headstock spindle omitted and illustrating a spinning roll in retracted or "out" position;

Fig. 6 is a view similar to Fig. 5 but showing the spinning roll in extended or "in" position at the completion of a spinning operation;

Fig. 7 is a vertical, somewhat diagrammatic, sectional view looking in the direction of the arrows 7—7, Fig. 6;

Fig. 9 is a diagrammatic view illustrating the three stations used in carrying out a cycle of operation on the improved spinning apparatus;

Fig. 10 is an enlarged fragmentary sectional view looking in the direction of the arrows 10—10, Fig. 5, showing the equalizing mounting for the roughing spinning roll;

Fig. 11 is a somewhat diagrammatic view illustrating the relative positions of the headstock, tailstock and roughing spinning roll when a tailstock has been moved by the turret to a position below the roughing spinning headstock;

Fig. 12 is a view similar to Fig. 11 but showing the tailstock raised to clamp the blank between the two die forms on the headstock and tailstock;

Fig. 13 is a view similar to Figs. 11 and 12 but showing the roughing spinning roll commencing a roughing spinning operation;

Fig. 14 is a view similar to Figs. 11 through 13 but showing the spinning roll completing a roughing spinning operation;

Fig. 15 is a view similar to Figs. 11 through 14 but showing the spinning roll retracted and the tailstock lowered and ready to be advanced by the turret to the finish spinning station;

Fig. 16 is a view similar to Fig. 14 but showing the completion of a finish spinning operation;

Fig. 17 is a view similar to Fig. 15 but showing the finish spinning roll retracted and the tailstock lowered and ready to be advanced to the loading station where the finished pulley illustrated may be unloaded and a new blank inserted;

Fig. 18 is a sectional view of a finished pulley; and

Fig. 19 is a wiring and piping diagram showing the electrical and hydraulic control devices.

Similar numerals refer to similar parts throughout the various figures of the drawings.

Figure 1:
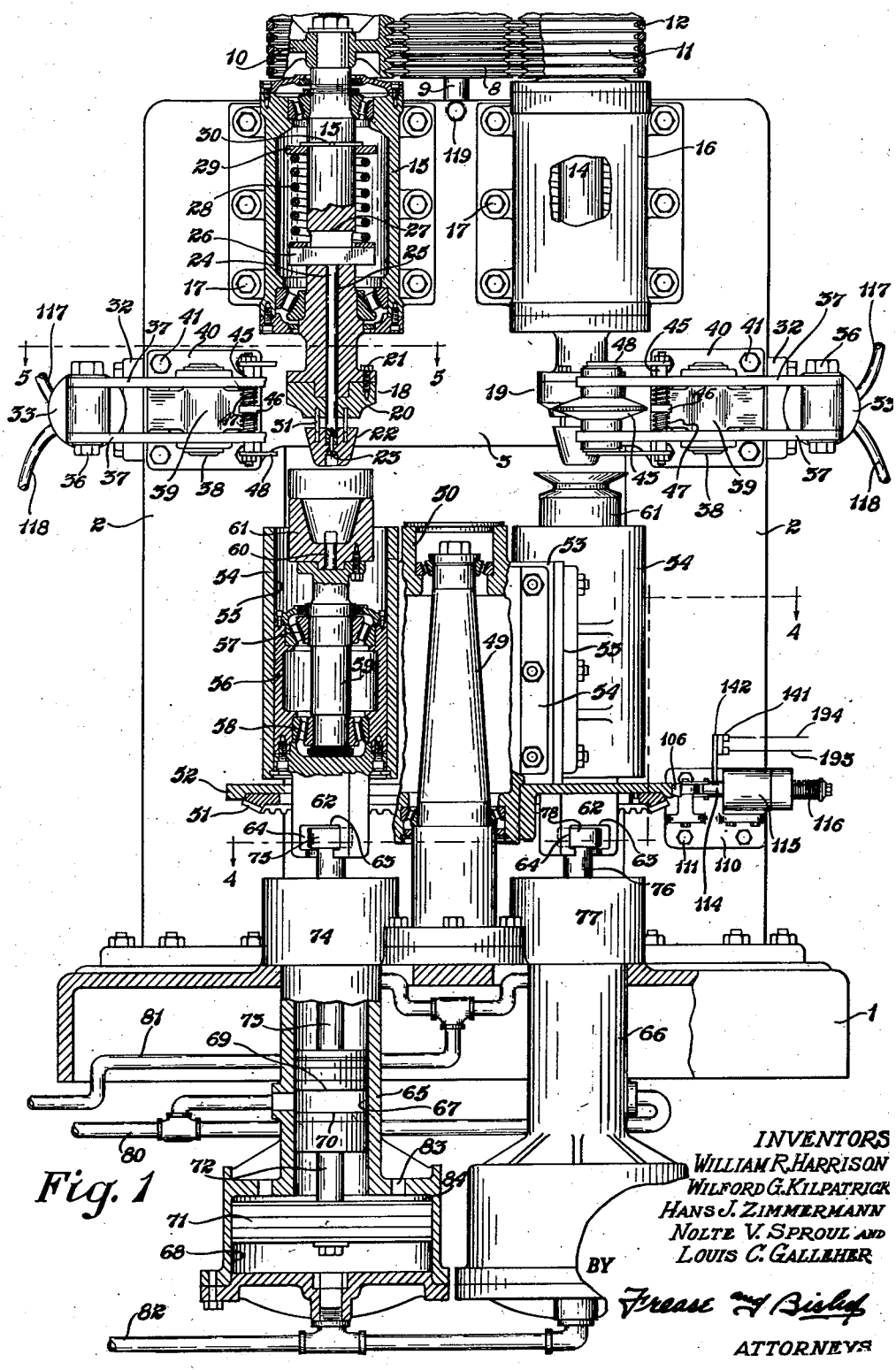
Figure 1 is a front elevation of the improved spinning paparatus with certain parts broken away and other parts in section as on the line 1—1, Fig. 2.

A machine for spinning V-groove pulleys incorporating the improvements of the present invention is illustrated in the drawings but it is understood that the principles and improvements of the invention may be utilized in spinning many kinds and types of metal articles other than V-groove pulleys preferably from rolled steel blanks, and that the invention is not limited specifically to the spinning of V-groove pulleys.

The improved automatic spinning apparatus includes a base 1 having upwardly projecting spaced pillars 2 thereon. The upper ends of the pillars 2 are preferably connected by a breast plate 3; and a drive motor support member 4 is adjustably mounted by slot means 5 and bolts 6 on the upper ends of the pillars 2, and spans the space therebetween. A main drive motor 7 is supported on adjustable support 4 suspended therefrom and located between the pillars 2.

Figure 2:
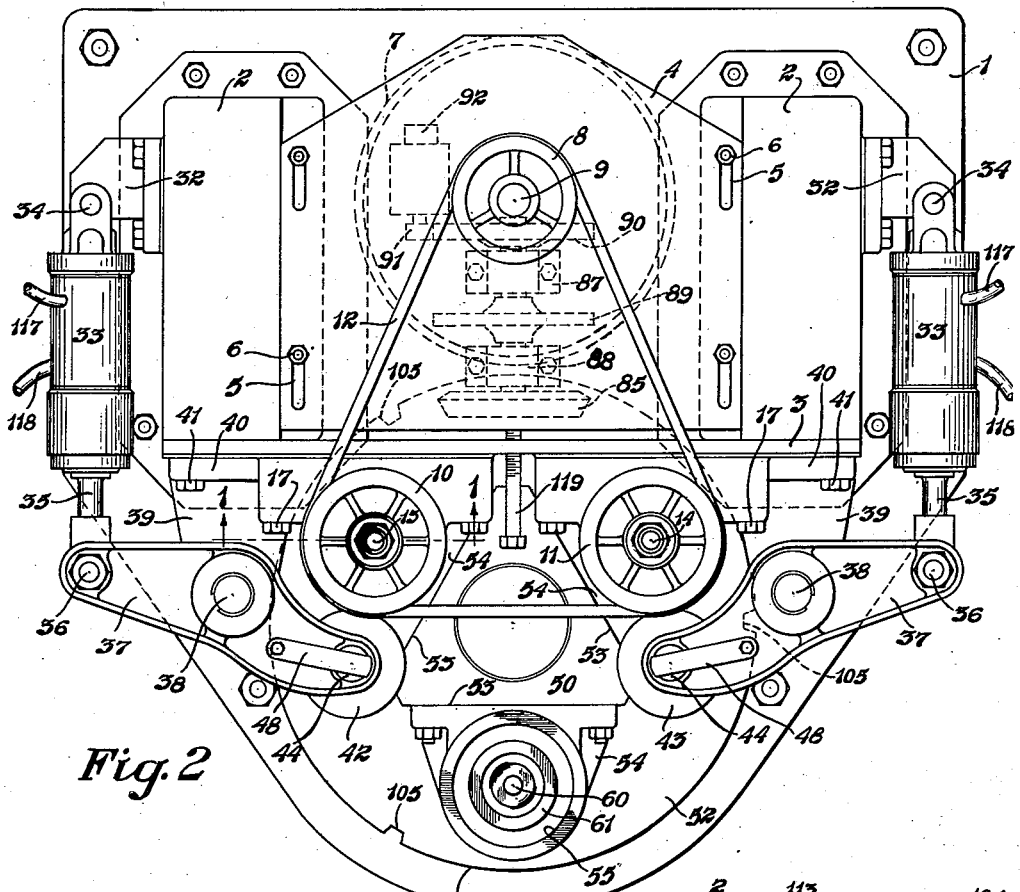
Fig. 2 is a top plan view of the improved spinning apparatus.

A multigroove drive pulley 8 is mounted on the main drive motor shaft 9 above support member 4 and drives two multigroove headstock pulleys 10 and 11 by a three-point drive through belts 12 as shown in Fig. 2. The headstock drive pulleys 10 and 11 are mounted on the upper ends of headstock spindles 13 and 14 which are journaled for rotation in headstock housings 15 and 16 mounted side by side at 17 on the breast plate 3.

The antifriction bearing mounting of the headstock spindles 13 and 14 in housings 15 and 16 is such as to prevent any axial movement of the spindles 13 and 14. A rough spinning headstock die form generally indicated at 18 is mounted on the lower end of headstock spindle 13 and a finish spinning headstock die form generally indicated at 19 is mounted on the lower end of headstock spindle 14. Each of the headstock die forms 18 and 19 is preferably formed of a plurality of parts movable relative to one another. Thus, the die form 18 preferably includes a flanged member 20 secured preferably by bolts 21 to the lower end of spindle 13, and a movable preferably tapered plug or pad member 22 secured by a bolt 23 to the lower end of a rod 24 extending upward through the hollow bore 25 of spindle 13 and having a cross head 26 at its upper end.

The cross head 26 is arranged to move up and down in slot 27 formed in spindle 13. A spring 28 reacts between cross head 26 and disc member 29 held by split ring 30 against upward movement on spindle 13. Thus, the spring 28 normally tends to press die form pad 22 downward to a position spaced from the under surface of die form part 20 as shown in Fig. 1. Pins 31 may be mounted on the lower face of die form member 20 extending into holes in die form member 22 and movable axially in said holes to permit relative axial movement between die form members 20 and 22 and to prevent relative rotary movement therebetween.

The construction of the die form member 19 and its mounting on spindle 14 is identical with the construction and mounting of the die form member 18 just described except that the contour of the finish spinning die form member 19 may in some cases be slightly different than the contour of the rough spinning die form 18.

Accordingly, when the main drive motor 7 is running, if pulleys 10 and 11 are of the same size, the headstock die forms 18 and 19 are positively driven at the same speed of rotation which may be for example 1500 R. P. M. A bracket 32 is mounted on the outside face of each pillar 2 near the top of the pillar and an hydraulic cylinder 33 is pivotally mounted on a vertical axis at 34 on each bracket 32 to swing in a horizontal plane. A double acting piston (not shown) is movable in each cylinder 33 and the piston rod 35 thereof is pivoted at 36 between two bell crank levers 37 pivotally mounted at 38 on a bracket 39 having a flange 40 mounted on the breast plate 3 by bolts 41.

A rough spinning roll generally indicated at 42 is journaled for rotation between the inner ends of the lefthand (viewing Fig. 1) set of bell crank levers 37 and a similar finishing spinning roll 43 is journaled for rotation between the inner ends of the righthand set of bell crank levers 37. Each spinning roll 42 and 43, in addition to being journaled for rotation, is mounted for floating or self-adjustable axial movement.

This floating or self-adjustable movement may be provided by journaling the ends 44 of the spinning roll shafts for rotary movement in bell crank levers 37 and by providing a yielding equalizing device preferably including a shaft 45 flanged at 46 extending through the upper and lower bell crank levers 37 adjacent the spinning rolls. Springs 47 of equal tension react between the flange 46 and the bell crank levers 37 normally to hold the flange 46 equidistant between the upper and lower bell crank levers 37. A projecting bar 48 is fixed to each outer end of the shaft 45 and the projecting end of each bar 48 engages the respective end of the spinning roll shaft 44.

Thus, each spinning roll 42 and 43 while rotating may move upward or downward axially of its shaft in accordance with force which may be applied thereto or resistance to which it may be subjected. When such force or resistance is removed, it will again assume a central position by the action of springs 47. This construction of the spinning roll mounting is termed herein a "self-equalizing" or a "self-adjusting" mounting for a purpose to be hereafter described.

A rotary turret post 49 projects vertically upward from the base 1 in front of and intermediate the pillars 2 and a rotary turret 50 having a crown ring gear 51 and an indexing plate 52 at its lower end is journaled on said turret post 49. The turret 50 is preferably formed to have a generally equilateral triangular shape in cross section so as to provide three vertical faces 53 whose planes are normal to planes radial of the turret shaft 49 spaced 120° apart.

A tailstock slide bracket 54 is mounted on each turret face 53 and each bracket 54 is provided with a cylindric tailstock slide bore 55 extending vertically thereof. A tailstock slide housing 56 is slidably and non-rotatably mounted in each cylindric bore 55 and provided with upper and lower antifriction bearings 57 and 58 in which a tailstock spindle 59 is mounted. A pilot pin 60 and a tailstock die form 61 are fixed to the upper end of each tailstock spindle 59.

A connector member 62 is mounted on the lower end of each tailstock spindle housing 56 below the lower end of the tailstock spindle 59 and the underside of member 62 is formed with a restricted open end T-slot 63 the side walls 64 of which are formed as cylindric surfaces with respect to the axis of rotation of the turret member 50.

Below the turret 50 there are provided two separate tailstock elevators, each constituting a reciprocating fluid motor which is stationary with respect to the rotation of the turret 50 and attached parts, and these tailstock elevators are described in detail as follows:

A tailstock operating or elevator cylinder member 65 is mounted in the base 1 in axial alignment below the headstock spindle 13 and another tailstock operating or elevator cylinder member 66 is similarly mounted on the base 1 axially below the headstock spindle 14. Each tailstock operating cylinder member 65 and 66 includes wall forming an elongated primary cylinder 67 and an enlarged secondary cylinder 68 at the lower end of the cylinder 67. A double-acting actuating or elevator piston 69 is mounted for movement in cylinder 67, and a follower piston 70 is also mounted for movement in cylinder 67 spaced from and below actuating piston 69. An equalizing piston 71 is mounted for movement in cylinder 68. Pistons 70 and 71 are connected by an elevator piston rod 72 for unitary movement; and elevator piston rod 73 connected to actuating or elevator piston 69 extends upward through stuffing box 74 and above the upper end of operating cylinder member 65 and terminates in an enlarged connector head 75. Similarly, an elevator piston rod 76 extends upward from the actuating or elevator piston 69 in operating cylinder member 66 through stuffing box 77 to above the upper end thereof and terminates in an enlarged connector head 78.

Actuating or elevator piston 69 is illustrated in Fig. 1 at its limit of downward movement or retracted position and is illustrated in Fig. 7 at its limit of upward movement or extended position. When piston rods 73 and 76 are in down position as shown in Fig. 1, rotary turret 50 may be rotated and T-slots 63 in the connector members 62 mounted on the lower ends of the tailstock spindle housing move in a circular path defined by the dot-dash circular center line 79 in Fig. 4.

Thus, the turret member 50 may be rotated to bring any one of its three tailstock spindles into axial alignment with either of the two headstock spindles 13 or 14 and the respective actuating or elevator piston rods 73 and 76 in axial alignment therebelow. As illustrated particularly in Figs. 1, 4 and 7, when two of the tailstock spindles 59 are in axial alignment with and between the two headstock spindles 13 and 14 and the respective actuating or elevator piston rods 73 and 76 therebelow, the enlarged connector heads 75 and 78 of the actuating or elevator piston rods are located or coupled within the T-slots 63 of the connector members 62 of said two tailstock spindles 59, so that upward or downward movement of the actuating or elevator piston rods 73 and 76 imparts corresponding upward or downward movement to said two tailstock spindles 59 for moving the tailstock die forms 61 mounted on said two tailstock spindles toward or away from the headstock die forms 18 and 19.

Upward movement of the actuating or elevator pistons 69 in cylinder members 65 and 66 is accomplished by admitting hydraulic pressure from a common hydraulic line 80 to the primary cylinder 67 of each cylinder member 65 and 66 between the actuating or elevator piston 69 and the follower piston 70 therein.

Downward movement of the actuating or elevator pistons 69 is accomplished by admitting hydraulic pressure from a common hydraulic line 81 to the extreme upper end of primary cylinders 67 above actuating or elevator pistons 69 in each cylinder member 65 and 66.

Compressed air may be admitted from a common air line 82 to the secondary cylinders 68 below equalizing pistons 71 in each cylinder member 65 and 66. Relief openings or ports 83 may be provided communicating with the space 84 above each equalizing piston 71 in the secondary cylinders 68 of each cylinder member 65 and 66.

The rotary turret 50 is rotated by crown pinion 85 meshing with crown gear 51 and mounted (Fig. 3) on counter shaft 86 journaled in bearings 87 and 88 mounted on base 1. A control cam 89 is mounted on shaft 86 preferably between bearings 87 and 88 and a gear 90 is mounted at the rear of shaft 86 engaged and driven by pinion 91 on the shaft of fluid motor 92. An hydraulic supply line 93 supplies pressure to actuate the motor 92 which exhausts through line 94 and branch 95 to the decelerating valve 96 and branch 97 to line 98 leading to the sump. Another branch line 95a having a needle valve 96a connects directly between line 94 and sump return line 98 for a purpose to be later described. The valve 96 has an operating rod 99, the upper end of which is provided with a roller 100 riding on cam 89. Rod 99 is preferably spring pressed upward by a spring (not shown) to maintain the roller 100 in engagement with the peripheral surface of the cam 89 at all times. The cam surface is preferably cylindrical as shown at 101 in Fig. 8 except for a projection 102.

When roller 100 rides on surface 101, valve 96 is open and hydraulic pressure is supplied from supply line 93 through fluid motor 92, line 94, branch 95 to valve 96 and then to lines 97 and 98. When roller 100 rides on projection 102, valve 96 closes, cutting off the flow of fluid from fluid motor 92 thereby stopping the fluid motor. The needle valve 96a may be adjusted to permit a slight flow of liquid directly from line 94 to line 98, by-passing valve 96, and maintaining motor 92 under pressure even though it may be stopped by some other means.

A 3:1 gear ratio is provided between gears 51 and 85 so that one revolution of shaft 86 and gear 85 rotates turret 50 through one-third of a revolution or 120°, which is likewise the radial spacing between the axes of tailstock spindles 59 mounted on the turret 50.

Referring to diagrammatic Fig. 9, the turret 50 is indicated by a circle, and its axis of rotation is designated at 49 and its direction of rotation is indicated as being clockwise by the arrow 103. Headstock and tailstock spindles 13 and 14 are indicated by dot-dash lines and turret stations are denoted A, B and C. The station A is a loading and unloading station, the station B is a rough spinning station, and the station C is a finish spinning station. Tailstock spindles 59 are denoted by full line circles 59a, 59b and 59c.

If turret 50 is rotated 120° from the position shown in Fig. 9 by one complete revolution of turret indexing drive shaft 86, tailstock spindle 59a moves from station A to station B below headstock spindle 13, tailstock spindle 59b moves to station C below headstock spindle 14, and tailstock spindle 59c moves to station A. When turret 50 is rotated through a second 120°, spindle 59a moves to station C, spindle 59b moves to station A, and spindle 59c moves to station B. When turret 50 is again for a third time rotated through 120° completing a complete revolution, tailstock spindles 59a, 59b and 59c each again assume the positions shown in Fig. 9.

Thus, any tailstock spindle by continued intermittent rotary movement of turret 50 moves from loading and unloading station A, to rough spinning station B, to finish spinning station C, and back to loading and unloading station A; and each intermittent rotary movement of the turret is accomplished preferably by one revolution of turret drive shaft 86 for a reason to be later described.

If roller 100 has just ridden over projection 102 when any tailstock 59 is properly indexed in axial alignment between headstock spindle 13 and cylinder member 65, the roller 100 will again ride over projection 102 as shaft 86 completes another revolution and rotates turret 50 through one-third of a revolution. At this time, the particular tailstock spindle will be properly indexed in axial alignment between headstock spindle 14 and cylinder member 66.

Figures 4, 8:
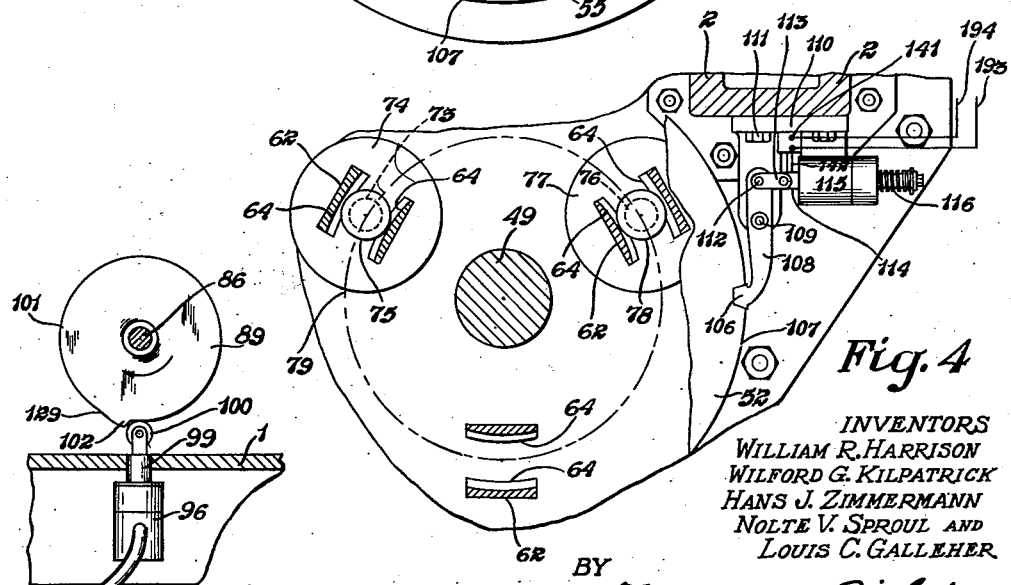
Fig. 4 is a fragmentary section looking in the direction of the arrows 4—4, Fig. 1.
Fig. 8 is a fragmentary sectional view looking in the direction of the arrows 8—8, Fig. 3.

In order to insure absolutely accurate indexing of the turret, and to lock the same in each indexed position, a turret control mechanism is provided as best shown in Figs. 1 and 4. Indexing plate 52 is provided with three peripheral notches 105 spaced 120° apart. A stop member 106 having the same shape as notches 105 is adapted to be projected into any notch 105 as the turret rotates and such notch 105 arrives at a position in alignment with locked stop member 106 which normally rides on cylindrical surface 107 of turret indexing plate 52.

Member 106 is preferably formed at the outer end of lever 108 pivoted at 109 on a bracket 110 mounted at 111 on one of the pillars 2. The inner end of lever 108 is pivoted at 112 to a link 113 pivoted to the rod 114 of a solenoid control device 115. The rod 114 may be moved to the left (Fig. 4) by the solenoid and is normally moved to the right by the pressure of spring 116 reacting between rod 114 and device 115.

Thus, the spring 116 acting upon the upper end of lever 108, causes lock member 106 to ride on the cylindrical surface 107 of indexing plate 52 and to project it into any notch 105 in indexing plate 52 to properly index the turret and lock it in indexed position. Lock member 106 may be retracted from engaged position with any notch 105 by energizing solenoid 115.

Referring particularly to Figs. 2, 5 and 6, either of the spinning rolls may be moved to extended or "in" position illustrated in Fig. 6, by admitting hydraulic pressure through line 117 to the rear end of cylinder 33. The spinning rolls are moved to retracted or "out" position illustrated in Fig. 5 by admitting hydraulic pressure through line 118 to cylinders 33.

Referring to Figs. 1 and 2, the drive belts 12 may be properly tensioned by adjustment of support member 4 to the rear (viewing Fig. 2) by adjusting screw 119, the bolts 6 operating in slots 5 being loosened and tightened in accomplishing such adjustment.

Pulleys having different sizes, diameters, widths and depths of grooves may be spun on the improved apparatus. Thus, the tailstocks are raised by fluid pressure which accommodates different piston strokes incident to changes in pulley size. The hydraulic actuation of the mechanism for moving the spinning rolls in or out likewise permits movement to different final spinning positions to accommodate changes in pulley sizes. An adjustable stop may be provided in the usual manner on the roll feed pistons, and the roll feed limit switches may likewishe be adjustable, for accommodating the spinning of pulleys of different sizes.

For any particular pulley, the movement of the tailstock operating pistons and the spinning roll pistons may control the operation of other parts by limit switches the positions of which may be adjusted.

The contours of the die forms 18, 19 and 61 and of the spinning rolls 42 and 43 may be changed for different articles to be spun. For this purpose the die forms and rolls are mounted so that they may be readily changed. Since the spinning rolls 42 and 43 are subjected to the greatest wear in operation, it is desirable to provide for the quick and ready replacement of spinning rolls with a minimum of machine shutdown time. This may be accomplished as best shown in Fig. 10 by forming each spinning roll 42 or 43 as an annular ring having a generally triangular cross section. The inner annular surface of the ring is preferably formed with a groove 120 in which a split ring 121 may be seated for assembling ball bearings 122 within the spinning roll ring. The bearings 122 are mounted on an enlarged central portion 123 of spinning roll shafts 44 and bushings 124 journal the reduced ends 125 of each shaft 44. The bushings 124 in turn are journaled at 126 in the bell crank levers 37.

Caps 127 secured by screws 128 to the ends of shaft 44 maintain the bushings 126 and bearings 122 assembled on the shafts 44 so that any spinning roll 42 or 43 may rotate on its shaft 44 and so that the entire assembly may move upward or downward (Fig. 10) with the bushings 124 sliding within the bores 126 of the bell crank levers 37 to provide the self-equalizing movement.

When it is desired to change a spinning roll, it only is necessary to swing the bars 48 out of engagement with the caps 127, to then remove one of the screws 128 permitting its cap 127 to be removed. Assuming that the upper cap 127 has been removed, the shaft 44 and lower bushing 124 may then be removed axially from the lower bore 126 and from within the bearings 122. The bearings 122 may then be removed from the spinning roll 42 and inserted in a new spinning roll and the parts reassembled in the reverse order.

The one-revolution cam 89 (Fig. 8) for controlling the operation of the turret 50 provides a simple means by which any tailstock can be advanced from station to station and properly and accurately indexed at such station so that a spinning operation may be properly performed with all parts in accurate relative location and alignment.

The cam 89 cooperating with decelerating valve 96, turret lock 105—106, and fluid motor 92 performs an additional function. Thus (Figs. 3 and 8) when valve 96 is open when roller 100 rides on cylindrical surface 101, full fluid pressure is acting on fluid motor 92 to rotate turret 50 at maximum speed. As cam 89 approaches the completion of one revolution—and turret 50 approaches a new indexed position—roller 100 rides along inclined surface 129 of cam projection 102, thus closing valve 96 at a rate determined by the slope of surface 129 until the valve 96 is completely closed when roller 100 arrives at the top of projection 102.

As valve 96 closes, fluid flow through line 97 is reduced, thus slowing down fluid motor 92 as the turret approaches the position at which it is to be stopped. Movement of the turret is stopped completely just as roller 100 rides off of projection 102 (the position shown in Fig. 8) because at this time the turret lock 106 is projected into one of the turret notches 105 to lock the turret in indexed position.

When the turret has thus been locked by members 105—106, valve 96 has again opened so that fluid may again flow therethrough, thereby maintaining the fluid motor under pressure. However, motor 92 cannot rotate turret 50 because the turret is maintained stopped in properly indexed position by the lock 105—106. By maintaining the fluid motor 92 under pressure, the turret drive motor is instantly ready to accelerate and rotate the turret whenever the lock 106 is retracted from the notch 105. The needle valve 96a is provided for leading any desired amount of fluid directly from motor 92 to sump line 98 so as to insure the maintenance of fluid pressure on the motor at all times, thereby insuring the application of torque to the turret at all times.

Thus, each time the turret 50 is required to rotate, the stop 106 is retracted and the turret is allowed to rotate. The stop 106 is then immediately released in order to stop the turret at the next station. Just before the turret reaches each station, the valve 96 is partially closed causing motor 92 to serve as a brake to cushion the stop.

The progress of a rough spinning step is illustrated in Figs. 11 through 15. In Fig. 11, a drawn cup 130 is illustrated at rest in position in a tailstock die form 61 at the upper end of one of the tailstock spindles 59, the cup 130 being the blank from which a pulley is to be spun and having been placed in the die form 61 at the loading station A (Fig. 9) and the die form 61 having been moved by the turret 50 to the station B beneath the rough spinning headstock spindle 13. The drawn cup 130 includes an annular wall 131 at one end of the hub portion 132.

When the tailstock spindle 59 is raised (Fig. 12), the pad member 22 of the headstock die form 18 clamps the hub portion 132 of the cup member 130 against the tailstock die form 61 and as the die form 61 continues to move up, the upper edge 133 of the annular wall 131 engages the flange member 20 of the die form 18. As the cup 130 is clamped between and engaged by the die forms 18 and 61, cup 130, die form 61, and tailstock spindle 59 rotate due to the continuous rotation of the headstock spindle 13 by main drive motor 7.

The rough spinning roll 42 is then moved toward the rotating pulley blank 130 as shown in Fig. 13 and engages the annular wall 131 and commences to roll a V-groove therein. As the annular wall 131 collapses and the V-groove commences to form therein, tailstock die form 61 continues its movement upward to follow up the collapsed wall, maintains the blank 130 clamped against the pad member 22 of the upper die form 18, and causes the upper edge 133 of blank 130 to form outwardly along the tapered portion 134 of the die form flange member 20. Meanwhile, the pad member 22 moved upwardly, slightly, while maintaining the blank 130 clamped against the lower die form 61, because of the yielding spring mounting 28 (Fig. 1) of the pad member 22.

The rough spinning roll 41 continues to move inward to complete the rough spinning operation to the final position shown in Fig. 14, thus forming a V-groove to approximately its final shape with a rounded valley 135 in the flange 131 of the blank 130, the lower die form 61 following upward and approaching closer to the flanged member 20 of the upper die form 18. Meanwhile, the pad 22 continues to hold the cup clamped against the lower die form 61.

The spinning roll 42 is then retracted to the position shown in Fig. 15, and the tailstock spindle 59 is lowered so that the turret 50 can be turned to move the rough spun pulley 136 from the rough spinning station B to the finish spinning station C.

The operation of the self-equalizing or self-adjusting mounting of the spinning rolls comes into play during the progress of spinning shown in Figs. 11 through 15. In Figs. 11, 12 and 15, the spinning roll 42 is illustrated in a position midway between the upper and lower bell crank levers 37. This central position is indicated by a plane illustrated by a dot-and-dash line 137 passing through the center of the spinning roll perpendicular to its axis of rotation. However, in Figs. 13 and 14, the spinning roll 42 has moved upward with reference to said plane 137 because of the spinning operation being performed by the roll 42 during which the roll 42 adjusts itself to the various forces acting between it, the blank 130, and the die forms 18 and 61 in forming the V-groove 135 in the blank.

At the completion of the spinning operation illustrated in Fig. 14 the roll 42 has moved upward with respect to the plane 137 a maximum distance and equal pressure is exerted by the forming surfaces of the roll against both flanges of the V-groove 135.

The self-equalizing mounting of the spinning roll permits the spinning roll 42 (Fig. 12) as it approaches the annular wall 131, to commence to roll the groove midway between the upper and lower ends of the annular surface 131 so that the V-groove is properly formed and positioned in the annular wall 131 of the blank 130.

After the tailstock 59 has arrived at the position illustrated in Fig. 15, the turret 50 is moved to bring said tailstock to station C beneath the finish spinning headstock spindle 14 (Fig. 16). The tailstock spindle 59 is then raised, the finish spinning roll 43 is moved into the rough formed pulley groove 135 and roll 43 spins and irons the side walls of the V-groove to exact contour and size. The die forms 19 and 61 operate during the finish spinning operation in the same manner as described in connection with Figs. 11 through 15. The parts are shown in Fig. 16 in the positions which they assume when the finish spinning operation has been completed to form the V-groove to finished shape 138.

The spinning roll 43 is then retracted to the position shown in Fig. 17, the tailstock spindle 59 is lowered, and the turret 50 then is moved to move said tailstock spindle 59 from station C to station A where the finished pulley 139 may be removed from and a new blank 130 inserted in the lower die form 61. During the operations described, the pilot pin 60 on the lower die form 61 maintains the pulley blank 130 centered and properly located in the lower die form 61.

After the finished pulley 139 is removed from the spinning apparatus at station A, the upper flange of the V-groove may be cut off at 140 to the desired size, as shown in Fig. 18 where the finished product is illustrated.

During the spinning operations just described, it is important to maintain axial pressure between the die forms 18 or 19 and 61 at all times during the application of the radially directed pressure of the spinning rolls. This is accomplished by the tailstock operating cylinder mechanism.

Each tailstock initially is moved upward by admitting fluid pressure into cylinder 67 (Fig. 1) below actuating piston 69. The actuating piston 69 below headstock spindle 13 moves rapidly upward until the edge 133 of blank 130 engages surface 134 of upper die form member 20 when further upward movement of tailstock 59 is momentarily stopped. However, fluid pressure continues to act within cylinder 67, and when the resistance encountered by the drawn cup pressed against the headstock is sufficient to overcome the air pressure under piston 71, follower piston 70 moves downward against the air pressure maintained in secondary cylinder 68. At about the same time, the spinning roll 42 has moved toward the rotating blank 130 and has commenced to form the V-groove therein. As the annular wall 131 collapses or gives way radially due to the pressure of the spinning roll 42 at about the position shown in Fig. 13, the upward pressure of the tailstock spindle must be maintained and the tailstock 59 must move upward again to follow up the giving way of the blank wall 131.

At this time, the air pressure in secondary cylinder 68 instantaneously moves equalizing piston 71 upward accompanied by coincident movement to follower piston 70, the fluid in primary cylinder 67 and main piston 69. As the spinning roll 42 reaches the inward limit of its movement as shown in Fig. 14, the tailstock 59 reaches its upper limit of movement and the spinning roll 42 dwells for a time to iron the work-piece and obtain a uniform surface finish and dynamically balanced characteristics in the spun pulley. During this dwell, the hydraulic pressure is maintained and the air piston 71 moves downward to a lowermost position so that maximum axial pressure is applied to the work-piece by the fluid in primary cylinder 67 and the air pressure in secondary cylinder 68 at the end of the spinning operation.

After spinning roll 42 moves outward to the position shown in Fig. 15, piston 71 moves upward and piston 69 is moved downward rapidly by the admission of hydraulic pressure through line 81 to cylinder 67 above actuating piston 69. When piston 69 is being moved upward by hydraulic pressure supplied through line 80, line 81 is connected to a sump; and when piston 69 is being moved downward by hydraulic pressure supplied through line 81, cylinders 67 exhaust through line 80 to the sump.

Referring to Figs. 1 and 4, a normally open return-type limit switch 141 is mounted in any suitable manner adjacent rod 114 controlled by solenoid 115, and limit switch 141 is closed by knocker 142 preferably mounted on rod 114 when turret lock member 106 is engaged in one of the notches 105 in the turret indexing plate 52. When lock member 106 is retracted from notch 105 and when it rides on the periphery of indexing plate 52, knocker 142 is moved away from limit switch 141 and limit switch 141 opens.

Referring to Figs. 5 and 6, a normally open return-type limit switch 143 is preferably mounted on each of the roll feed cylinders 33. Each switch 143 is adapted to be actuated by a knocker 144 preferably mounted on piston rod 35 to close the switch when its spinning roll is in retracted position as shown in Fig. 5. When the spinning roll moves away from retracted position, knocker 144 is moved away from limit switch 143 is moved away from limit switch 143 and limit switch 143 opens.

Referring to Figs. 1 and 7, a normally open return-type limit switch 145 is mounted on each piston rod 73 and 76 of the tailstock operating cylinders, and another normally open return-type limit switch 146 is similarly mounted. A knocker 147 for actuating limit switch 145 is preferably mounted on each cylinder head 74 and 77; and a knocker 148 for actuating switch 146 is preferably mounted on each tailstock slide bracket 54. Each switch 145 is closed by knocker 147 when the tailstocks are in "down" position illustrated in Fig. 1 and as the tailstocks are raised, switches 145 move away from knockers 147 and switches 145 open. Each switch 146 is closed by knocker 148 when the tailstocks are in "up" position, and when the tail stocks are lowered, switches 146 move away from knockers 148 and switches 146 open.

The foregoing constitutes a detailed description of the various parts of the improved metal spinning apparatus by which a V-groove is formed in a pulley by spinning the cylinder wall of a previously drawn cup. The spinning operation is accomplished by collapsing the wall of the drawn cup by means of an idling spinning roll which is used to form and shape the metal to the contour of the roll and mating forms. This detailed description, however, does not include a description of the safety, timing, control and operating mechanisms which will be described in connection with the cycle of operation of the apparatus.

In connection with the illustration of some mechanisms in certain of the figures of the drawings, some parts which would normally appear in those figures have been omitted so as to provide a clear illustration of the particular mechanisms shown in such figures of the drawings.

The spinning steps per se have been described in connection with Figs. 11 through 17. The complete operation of the improved apparatus and the coordination of the various mechanisms therein, however, may be described and understood best by first outlining briefly the "cycle of operation" of the apparatus; by then describing the "safety provisions and interlocks"; and by then describing in detail the operation of the safety, timing, control, and operating mechanisms which initiate, perform and control the cycle of operation.

*Cycle of operation*

The cycle of operation of the improved metal spinning apparatus may be described conveniently as consisting of twelve operation or steps. Assume that all parts of the apparatus are momentarily at rest except the main drive motor 7 which is continuously rotating thereby rotating the headstock spindles 13 and 14. The turret 50 at this time is locked in an indexed position, all three tailstocks 59 are down and the spinning rolls 42 and 43 are in "out" or retracted position.

*Operation 1.*—A drawn cup 130 is carried from loading station A to rough spinning station B by indexing turret 50 (Fig. 9).

*Operation 2.*—Tailstock 59 is moved "up" pressing drawn cup 130 against headstock 13 in the position shown in Fig. 12. Friction between cup 130 and rotating headstock accelerates drawn cup and tailstock until all three parts rotate simultaneously.

*Operation 3.*—Rough spinning roll 42 moves from "out" position (Fig. 5) to "in" position (Figs. 6 and 14), thus collapsing wall 131 of cup 130 to form rough spun pulley 136. As the wall 131 of the cup is collapsed, the tailstock must follow up to maintain the proper total pressure between the die forms on the headstock and tailstock.

*Operation 4.*—Spinning roll 42 is allowed to dwell in "in" position for approximately one second and then is returned to "out" position.

*Operation 5.*—Tailstock 59 is returned to "down" position, thus lowering the rough spun pulley 136 from the rotating headstock 13 (Fig. 15).

*Operation 6.*—(Simultaneous with operation 1.) Another rough spun pulley 136 at station B is carried from station B to finish spinning station C.

*Operation 7.*—(Simultaneous with operation 2.) The tailstock below headstock 14 is moved "up" pressing rough spun pulley 136 against headstock 14. Friction between pulley and rotating headstock accelerates pulley and tailstock to rotate simultaneously.

*Operation 8.*—(Simultaneous with operation 3). Finish spinning roll 43 moves from "out"

position to "in" position further collapsing the rough spun pulley 136 to form the exact contour of the finished pulley groove (Fig. 16). Tailstock 59 meanwhile maintains total pressure against the pulley, including a slight "follow up" due to further collapsing of the pulley.

*Operation 9.*—(Simultaneous with operation 4.) Pressure is maintained on the finish spinning roll 43 in "in" position for approximately one second in order to iron the surface of the pulley groove to exact size, then finish spinning roll 43 is returned to "out" position.

*Operation 10.*—(Simultaneous with operation 5). Tailstock 59 is returned to "down" position, thus lowering finished pulley 139 from rotating headstock 14.

*Operation 11.*—(Simultaneous with operations 1 and 6.) A finished spun pulley 139 is carried from station C to station A thus completing the cycle.

*Operation 12.*—(Simultaneous with operations 2 through 5 and 7 through 10.) The operator removes a finished pulley 139 from the tailstock at station A and inserts another drawn cup 130 into the die form, ample time elapsing during operations 2 through 5 and 7 through 10 for this manual loading and unloading to be performed.

Preferably, the total time required to complete the cycle of the twelve operations to spin any one pulley is 13½ seconds, that is to say, 4½ seconds for each ⅓ revolution of the turret 50 and the operations performed at any one station while the turret is stopped. During the 13½ second cycle, three pulleys are produced by the machine.

Safety provisions and interlocks

The safety, timing, control and operating mechanism presently to be described include certain safety provisions and interlocks as follows:

1. There are switches, not shown, controlling a relay in the main power line in a usual manner conveniently accessible to the operator at various places about the apparatus for stopping every part of the entire machine instantly in case of emergency.

2. It is impossible for the turret lock 106 to be retracted unless all tailstocks 59 are "down" and both spinning rolls 42 and 43 are "out."

3. It is impossible to move the tailstocks 59 "up" unless the turret lock 106 is engaged in one of the notches 105 and the spinning rolls 42 and 43 are "out."

4. It is impossible to move spinning rolls 42 and 43 to "in" position unless the tailstocks 59 are "up" and the turret 50 is locked in an indexed position.

5. It is impossible to move the tailstocks 59 "down" unless the spinning rolls 42 and 43 are "out" and the turret 50 is locked in indexed position.

These safety measures are preferably provided by electrical interlocks which preferably include the following:

1. The turret index lock 106 is retracted by the solenoid 115, the circuit to which is completed through limit switches 143 which are only closed when the spinning rolls 42 and 43 are "out," and through limit switches 145 which are only closed when the tailstocks are "down."

2. The tailstock pistons are moved "up" hydraulic pressure controlled by a solenoid operated valve. The electrical circuit for operating the solenoid to raise the tailstocks to "up" position is only completed when limit switch 141 is closed (when turret lock 106 is engaged). At this time, the spinning rolls 42 and 43 are being held in "out" position by a holding circuit.

3. The roll feed pistons in cylinders 33 are moved to move the spinning rolls 42 and 43 to "in" position by hydraulic pressure controlled by a solenoid operated valve. The circuit to the solenoid for moving the rolls to "in" position is only completed when limit switches 146 are closed when the tailstocks are in "up" position. At this time, there is a holding circuit, maintaining the tailstocks "up," closed when limit switch 141 is closed when turret lock 106 is engaged.

4. Similarly, the solenoid cooperating with the valve for returning the roll feed pistons to "out" position is in an electric circuit established while a holding circuit holds the tailstocks "up." This holding circuit is only completed when limit switch 141 is closed when the turret lock 106 is engaged.

5. The tailstocks are moved to "down" position by hydraulic operation controlled by a solenoid operated valve. The circuit to the solenoid is completed through limit switches 143 which are closed when the spinning rolls 42 and 43 are in "out" position. At this time, the turret lock 106 is engaged.

Control apparatus

The safety, timing, control and operating mechanisms, which initiate, perform and control the cycle of operation are illustrated diagrammatically in Fig. 19 which is a diagram of wiring and piping.

The control devices shown in this diagram include the following:

A timer 149 which may operate continuously or which may be started and stopped by a push button, not shown, at the will of the operator. The timer 149 is preferably an adjustable speed timer of any usual construction having a maximum speed for its timer shaft of 4½ seconds per revolution;

A sequence controller including a shaft indicated by the dot-dash line 150 connected to the timer shaft having mounted thereon an index control cam 151, a tailstock control cam 152, and a roll feed control cam 153. A preferably single pole, single throw, normally open switch 154 is actuated by cam 151 and functions as an index actuating switch. A single pole, double throw, return-type switch 155 is actuated by cam 152 and functions as a tailstock actuating switch. A single pole, double throw, return-type switch 156 is actuated by cam 153 and functions as a roll feed actuating switch;

Hydraulic control valves, preferably solenoid operated four-way tailstock control valve 157 and solenoid operated four-way roll feed control valve 158; and Interlocking limit switches 141, 143, 145 and 146 previously described and operatively associated with various parts of the mechanical apparatus.

Each of the hydraulic operating cylinders is generally controlled by the control devices just enumerated except that the hydraulic turret motor is controlled by the turret decelerating valve 96 actuated by the one-revolution control cam 89.

The operation of the control devices commencing at operation 1 is as follows:

Timer 149 is just at a position to commence a 4½ second cycle and cams 151, 152 and 153 are in the positions and relative positions shown in Fig. 19 which may be said to be the 0° position of said cams and of cam shaft 150. A circuit previously established is closed from main power line 159, through contacts 160 and 161 of switch 156 (closed when roll 162 rides in valley 163 of cam 153), line 164, "out" solenoid 165 of roll feed control valve 158, and line 166 to the other side 167 of main power supply.

When solenoid 165 is energized, four-way valve 158 is in a position that hydraulic pressure in pipe 93 connects through branch 168, valve 158, pipe 169, and pipes 118 to roll feed cylinders 33 holding spinning rolls 42 and 43 "out" and limit switches 143 closed. Also, hydraulic pipe 117 is connected through branch 170, and four-way valve 158 to branch pipe 171 leading to the sump.

Another previously established circuit is also maintained from line 159 through contacts 172 and 173 of switch 155 (closed when roll 174 rides in valley 175 of cam 152), line 176, roll feed cylinder limit switches 143, line 177, "down" solenoid 178 of four-way tailstock control valve 157, and line 179 to power supply line 167.

When solenoid 178 is energized, four-way valve 157 connects hydraulic pressure pipe 93 through branch 180 with pipe 81 leading to the top side of tailstock cylinders 65 and 66 to hold the tailstocks "down," at which time limit switches 145 are maintained closed. At this time, pipe 80 leading from the lower end of tailstock cylinders 65 and 66 communicate through four-way valve 157 with pipe 181 connected with pipe 171 leading to the sump.

A circuit is established through contacts 182 and 183 of switch 154 (closed by roll 184 riding on raised portion 185 of cam 151) said circuit running from line 159 through line 186, contacts of limit switch 145 of lefthand tailstock cylinder, line 187, contacts of limit switch 145 of righthand tailstock cylinder (limit switches 145 are closed when tailstocks are down), line 188, contacts 182 and 183 of switch 154, line 189, and solenoid 115 of index lock control device to the other side 167 of main power supply.

When solenoid 115 is energized, index lock 106 is retracted from notch 105 in turret index plate 52. Hydraulic pressure from the main line 93 leading from the pump is meanwhile acting on turret motor 92 and decelerating valve 96 is open. As soon as turret lock 106 is retracted, motor 92 turns the turret.

When shaft 86 has made one revolution, the turret will have revolved one-third of a revolution to reach the next indexed postion. Just prior to the completion of one revolution of shaft 86, roller 100 rides on inclined surface 129 of cam projection 102, closing decelerating valve 96 and stopping turret motor 92 at about the same time that turret lock 106 snaps into the next turret notch 105 to lock the turret in the next indexed position. Just as turret lock 105—106 is established, the decelerating valve 96 again opens as shown in Fig. 19 so that the fluid motor 92 is again under pressure ready to start rotating the turret the instant that the turret lock is again retracted.

Meanwhile, timer cam shaft 150 turns through 80° and roller 184 rides on valley 190 of cam 151 opening switch 154; roller 174 of switch 155 rides up on raised portion at 191 of cam 152 closing contacts 172 and 192 (and opening contacts 172 and 173) of switch 155; and roller 162 continues to ride in valley 163 of cam 153 maintaining contacts 160 and 161 of switch 156 closed.

The previously established circuit is thus held from main power line 159, through contacts 160 and 161 of switch 156, line 164, "out" solenoid 165 of roll feed control valve 158 and line 166 to the other side 167 of main power supply; and the solenoid 165 being energized continues to hold four-way valve 158 in such position that the spinning rolls are held "out."

A new circuit is established from main power line 159 through contacts 172 and 192 of switch 155, line 193, contacts of limit switch 141 (closed because turret lock 106 is engaged), line 194, "up" solenoid 195 of tailstock control valve 157, and line 196 to the other side 167 of main power supply.

When solenoid 195 is energized, four-way valve 157 is in a position that hydraulic pressure in pipe 93 connects through branch 180, valve 157, and pipe 80 to tailstock cylinders 65 and 66 to raise the tailstock cylinders "up" and to close limit switches 146 when the tailstocks are "up." At this time, the tailstock cylinders communicate through pipe 81, valve 157 and pipe 181 to the sump.

By the time the tailstock cylinders have reached "up" position and the limit switches 146 have closed, timer cam shaft 150 has turned through another 80°, or a total of 160° from 0° position. At this time, switch 154 is still open because roll 184 rides in valley 190 of cam 151; roll 174 still rides on raised portion of cam 152 maintaining contacts 192 and 172 of switch 155 closed; and roller 162 of switch 156 rides up on raised portion at 197 of cam 153 closing contacts 198 and 160 and opening contacts 160 and 161 of switch 156.

The circuit previously established from line 159 through contacts 172 and 192 of switch 155, limit switch 141, line 194, "up" solenoid 195 of tailstock control valve 157 and power supply line 167 is still maintained; thus holding the tailstocks "up."

A new circuit is established from main power line 159, through contacts 160 and 198 of switch 156, line 199, contacts of lefthand limit switch 146 (closed when tailstock cylinders are up), line 200, contacts of righthand tailstock cylinder limit switch 146, line 201, "in" solenoid 202 of roll feed control valve 158 and line 203 to the other side 167 of main power supply.

When solenoid 202 is energized, four-way valve 158 is in a position that hydraulic pressure in pipe 93 connects through branch 168, valve 158, pipe 170, and pipe 117 to roll feed cylinders 33, moving spinning rolls 42 and 43 "in."

After the spinning rolls 42 and 43 have moved to "in" position and have performed the spinning operation including a "dwell," the timer cam shaft 150 will have rotated through another 120°, or a total of 280° from the 0° position. At this time, roll 184 still rides in valley 190 of cam 151 maintaining switch 154 open; roll 174 still rides on raised portion of cam 152 continuing to maintain contacts 192 and 172 of switch 155 closed (the tailstock cylinder pistons thereby still "up"); but roll 162 rides into valley of cam 153 at 204 thereby opening contacts 198 and 160 and closing contacts 160 and 161 of switch 156.

At this time, a circuit is established from power line 159 through contacts 160 and 161 of switch 156, line 164, "out" solenoid 165 of roll feed control valve 158, and line 166 to the other side 167 of main power supply; thus energizing solenoid 165 which operates valve 158 to admit hydraulic pressure through pipe 169 and pipes 118 to roll feed cylinders 33 to move the spinning rolls 42 and 43 "out" when limit switches 143 will be closed.

By this time, timer cam shaft 150 has rotated through another 40° or a total of 320° from the 0° position; and roller 184 still rides in valley 190 of cam 151 maintaining switch 154 open; roller 162 still rides in valley 163 of cam 153 maintaining contacts 160 and 161 of switch 156 closed; and roller 174 rides into valley at 205 of cam 152 opening contacts 192 and 172 and closing contacts 172 and 173 of switch 155.

Since contacts 160 and 161 of switch 156 are still closed, solenoid 165 remains energized and the spinning rolls are maintained "out." A new circuit is established from line 159 through contacts 172 and 173 of switch 155, line 176, roll feed cylinder limit switches 143, line 177, "down" solenoid 178 of tailstock control valve 157, and line 179 to power supply line 167.

By energizing solenoid 178, hydraulic pressure acts through tailstock control valve 157 to the top of tailstock cylinders 65 and 66 to move the tailstocks to "down" position when limit switches 145 are closed.

Meanwhile, timer cam shaft 150 has rotated through another 40° and thus has returned to 0° position ready to start a new cycle of operations as just described.

Accordingly, the improved apparatus satisfies each and all of the objects set forth in the preamble of the specification and which for brevity are not repeated here; and provides substantially continuous and automatically operating spinning apparatus for rapidly spinning metal articles by which moving opposed axial thrusts or compressive forces and a radial roller spinning pressure angular thereto, are applied to a rotating article, the axial pressure at the beginning of the application of the roller spinning pressure being a minimum and increasing to a maximum at the completion of the operation, and the roller spinning pressure being equalized as applied to the rotating article between opposing axial thrusts or compressive forces.

In the foregoing description, certain terms have been used for brevity, clearness and understanding, but no unnecessary limitations are to be implied therefrom beyond the requirements of the prior art; because such words are used for descriptive purposes and not for the purpose of limitation and are intended to be broadly construed.

Thus, the word "hydraulic" used herein and in the claims is intended to include preferably oil, and also other liquids which may be used to operate cylinders; the word "air" is intended to include air or other gaseous material used to operate a cylinder; and the words "roller spinning" are intended to describe the operation performed between the rotating head and tailstock die forms and the spinning rolls regardless of the shape or the contour thereof.

Moreover, the invention is not limited to the exact structures shown herein, because the design of the various parts may be varied to provide other structural embodiments without departing from the scope of the present invention.

Having now described the features of the invention, the construction, manufacture, operation and use of a preferred form of improved apparatus, the details of the steps of the improved method, and the advantages and results obtained by the use of the same; the new and useful inventions, constructions, parts, elements, combinations, sub-combinations, methods, steps and procedures, and reasonable mechanical equivalents thereof obvious to those skilled in the art, are set forth in the appended claims.

We claim:

1. In metal spinning apparatus, a headstock, means for rotating said headstock, a rotatable tailstock movable axially toward and away from said headstock; and means for axially moving said tailstock including, a primary cylinder, a double acting hydraulically actuated actuating piston mounted for movement in the primary cylinder having a piston rod connectible with the tailstock, a follower piston mounted for movement in the primary cylinder spaced from said actuating piston, a secondary cylinder, an equalizing piston mounted for movement in the secondary cylinder, piston rod means connecting said follower and equalizing pistons, and air pressure means communicating with said equalizing piston in said secondary cylinder.

2. In metal spinning apparatus, a base, pillar means projecting upwardly from the base, two headstock spindles mounted for rotation at the upper end of said pillar means, means for rotating said headstock spindles in unison, three rotatable tailstock spindle members mounted on the base, means for moving said tailstock members to bring any selected two into axial alignment respectively with said two headstock spindles, separate means for moving the selected tailstock spindles when axially aligned with said headstock spindles toward and away from said headstock spindles, and said tailstock spindles being mounted for rotatable movement in unison with said headstock spindles.

3. In metal spinning apparatus including a rotatable indexing turret movable to selected indexed positions, a plurality of tailstock members mounted on the turret for movement circumferentially about the turret axis, said tailstock members each being rotatable about its own axis and being movable longitudinally of its axis, and separate means rotationally stationary with respect to the turret and connected with at least one of said tailstock members only when the turret is in an indexed position for moving such tailstock longitudinally of its axis.

4. In metal spinning apparatus including a rotatable indexing turret movable to selected indexed positions, a plurality of tailstock members mounted on the turret for movement circumferentially about the turret axis, said tailstock members each being rotatable about its own axis and being movable longitudinally of its axis, means connected with at least one of said tailstock members when the turret is in an indexed position for moving such tailstock longitudinally of its axis, said means including hydraulic tailstock actuating cylinder means having a connector member, and a member on said tailstock member provided with a T-shaped slot engaged with said connector member when the turret is in an indexed position.

5. Metal spinning apparatus including a multiple position rotary indexing turret, a plurality of headstocks, means for rotating said headstocks, a plurality of slide brackets mounted on the turret, a rotatable and axially movable tailstock mounted in each bracket, means separate from the turret for axially moving said tailstocks in the slide brackets, means for rotating the turret to selected indexed positions to locate said tailstocks in axial alignment with said headstocks, mating spinning die form members mounted on the headstocks and tailstocks engaging and clamping workpieces between mated members when the tailstocks are moved toward the headstocks, said tailstocks being rotated by the headstocks when the workpieces are clamped between mated members, axially yielding and self-equalizing spinning rolls means mounted for movement to and away from said die form members to uniformly work the workpiece between the spinning roll means and the mated members, and means for locking the turret in any indexed position.

6. Metal spinning apparatus including a multiple position rotary indexing turret, a plurality of headstocks, means for rotating the headstocks, a plurality of slide brackets mounted on the turret, a rotatable tailstock mounted in each bracket on the turret movable axially between "up" and "down" positions, means for axially moving said tailstocks in the slide brackets, means for rotating the turret to selected indexed positions to locate said tailstocks in axial alignment with said headstocks, mating spinning die form members mounted on the headstocks and tailstocks engaging and clamping workpieces between mated members when the tailstocks are moved toward the headstocks, said tailstocks being rotated by the headstocks when the workpieces are clamped between mated members, axially yielding self-equalizing spinning roll means mounted for movement to "in" and "out" positions to and away from said die form members to uniformly work the workpieces between the spinning roll means and the mated members, means for locking the turret in any index position, and means actuated upon arrival of the tailstocks at "down" position for unlocking the turret locking means.

7. Metal spinning apparatus including a multiple position rotary indexing turret, a plurality of headstocks, means for rotating the headstocks, a plurality of slide brackets mounted on the turret, a rotatable tailstock mounted in each bracket on the turret movable axially beween "up" and "down" positions, means for axially moving said tailstocks in the slide brackets, means for rotating the turret to selected indexed positions to locate said tailstocks in axial alignment with said headstocks, mating spinning die form members mounted on the headstocks and tailstocks engaging and clamping workpieces between mated members when the tailstocks are moved toward the headstocks, said tailstocks being rotated by the headstocks when the workpieces are clamped between mated members, axially yielding self-aligning spinning roll means mounted for movement to "in" and "out" positions to and away from said die form members to uniformly work the workpieces between the spinning roll means and the mated members, means for locking the turret in any indexed position, and means actuated in a cycle upon arrival of the tailstocks at "down" position for successively unlocking the turret lock, rotating the turret, locking the turret lock, moving the tailstocks to "up" position, moving the rolls to "in" position, moving the rolls to "out" position, and moving the tailstocks to "down" position.

8. Metal spinning apparatus including a multiple position work-carrying rotary indexing turret, a plurality of headstocks, means for rotating said headstocks, a plurality of slide brackets mounted on the turret, a rotatable and axially movable work-carrying tailstock mounted on the turret in each bracket, means for axially moving the tailstocks in the slide brackets, means for rotating the turret to selected index positions, mating spinning die form members mounted on the headstocks and tailstocks engaging and clamping workpieces between mated members when the tailstocks are moved toward the headstocks, said tailstocks being rotated by the headstocks when the workpieces are clamped between mated members, axially yielding self-equalizing spinning roll means mounted for movement to and away from said die form members to uniformly work the workpieces between the spinning roll means and the mated members, and means for locking the turret in any indexed position.

9. In metal spinning apparatus, a headstock, means for rotating said headstock, a rotatable tailstock movable axially toward and away from said headstock; and tailstock operating cylinder means for axially moving said tailstock including, primary cylinder means, actuating piston means in said primary cylinder means engageable with the tailstock, secondary cylinder means, equalizing piston means in said secondary cylinder means, fluid means to operate the actuating and equalizing piston means, and said equalizing piston means including a follower piston spaced from said actuating piston and connected with the equalizing piston and movable in the primary cylinder means.

WILLIAM R. HARRISON.
WILFORD G. KILPATRICK.
HANS J. ZIMMERMANN.
NOLTE V. SPROUL.
LOUIS C. GALLEHER.

REFERENCES CITED

The following references are of record in the file of this patent:

UNITED STATES PATENTS

| Number | Name | Date |
|---|---|---|
| 421,668 | Case | Feb. 18, 1890 |
| 451,184 | Manville | Apr. 28, 1891 |
| 701,589 | Livingston | June 3, 1902 |
| 757,080 | Yale | Apr. 12, 1904 |
| 1,028,652 | Wurzburg | June 4, 1912 |
| 1,603,921 | Peth | Oct. 19, 1926 |
| 1,711,075 | Zimmerman | Apr. 30, 1929 |
| 1,750,784 | Petersen | Mar. 18, 1930 |
| 1,828,464 | Harrison | Oct. 20, 1931 |
| 1,873,164 | Turnquist | Aug. 23, 1932 |
| 1,936,808 | Townsend | Nov. 28, 1933 |
| 2,019,493 | Hothersall | Nov. 5, 1935 |
| 2,041,309 | Verderber | May 19, 1936 |
| 2,062,415 | Harrison | Dec. 1, 1936 |
| 2,122,356 | Bullard | June 28, 1938 |
| 2,145,956 | Stern | Feb. 7, 1939 |
| 2,189,004 | Harwood | Feb. 6, 1940 |
| 2,196,930 | Loweke | Apr. 9, 1940 |
| 2,223,481 | Darling | Dec. 3, 1940 |
| 2,249,964 | Linder | July 22, 1941 |
| 2,251,810 | Smith | Aug. 5, 1941 |
| 2,270,590 | Johnson | Jan. 20, 1942 |
| 2,271,583 | Dornhofer | Feb. 3, 1942 |
| 2,317,099 | Groene | Apr. 20, 1943 |
| 2,355,132 | Affleck | Aug. 8, 1944 |
| 2,362,054 | Denison | Nov. 7, 1944 |
| 2,455,768 | Herman | Dec. 7, 1948 |
| 2,493,053 | Zatyko | Jan. 3, 1950 |

FOREIGN PATENTS

| Number | Country | Date |
|---|---|---|
| 232,255 | Germany | of 1911 |